UNITED STATES PATENT OFFICE.

HARALD LYKKE BAGGER MÖRCH, OF FREDERIKSBERG, DENMARK.

METHOD OF MANUFACTURING ARTIFICIAL LEATHER.

SPECIFICATION forming part of Letters Patent No. 647,979, dated April 24, 1900.

Application filed March 27, 1899. Serial No. 710,557. (No specimens.)

*To all whom it may concern:*

Be it known that I, HARALD LYKKE BAGGER MÖRCH, manufacturer, of Östre Fasanvej 20, Frederiksberg, Denmark, have invented certain new and useful Improvements in Methods of Manufacturing Artificial Leather; and I do hereby declare the following to be a full, clear, and exact description of the invention, such as will enable others skilled in the art to which it appertains to make and use the same.

My invention relates to an improved method of manufacturing artificial leather.

If the substitutes for leather hitherto produced have not been very much used, it is partly because it has not been possible to work them in the common way by sewing and pegging. So it has in producing the artificial leather in question been a main object to imitate the texture of natural leather as exactly as possible, so as to make the product sufficiently strong and tough to bear the same usage as natural leather. In the present invention this is attained by applying as raw material for artificial leather a felt composed of a suitable mixture of vegetable fibers and wool, which is saturated with substances that may partly cement together the single fibers of the felt to a whole and partly outwardly offer sufficient hardness and power of resistance.

The method is the following: Pure Italian hemp is cut in patches like ordinary wool and carded together with about half the quantity of coarse cleaned wool to a "wadding" of proper form, which is packed in linen and felted in the usual way and fulled. The felt thus produced is washed out and dried and then saturated with a composition consisting chiefly of linseed-oil, turpentine, glue, casein, and wax. The proportions of these ingredients may of course vary according to the condition of the product desired. In the following is quoted an instance how a material particularly fit for sole-leather may be produced. I mix fifty units of boiled linseed-oil, twenty-five units of colophony, twenty-five units of French turpentine, ten units of vegetable-wax, and ten units of glycerin and heat the mixture in a water-bath while stirring it up. To facilitate the mixture of the mentioned ingredients to a homogeneous compound, an addition of some ammoniacal water will prove to be of advantage. When the mixture is homogeneous, I further add twenty-five units of glue soaked in water and a casein solution, which is produced by dissolving fifty units of moist newly-precipitated casein in a saturated solution of sixteen units of borax and finally ten units of bichromate of potash. If desired, I may also add mineral dyeing materials and antiseptics. The whole is boiled until it forms a completely-equal sticky compound, into which the felt is dipped while the heating is continued. The impregnating matter is then absorbed among the fibers of the felt and uniformly spread by mechanical treatment—for instance, by rolling—when the felt has been removed from the bath.

The product obtained is first dried for about twenty-four hours at common temperature, then it is placed for about an hour in a solution of acetate of alumina, and finally dried perfectly.

The fibers which may after the drying protrude from the surface are now rubbed off, and the product is, if desired, dyed on the surface and then pressed between heated rollers and glazed. The article thus produced is in every respect very much like real sole-leather and may be worked in quite the same way as the latter.

Having now particularly described and ascertained the nature of my said invention and in what manner the same is to be performed, I declare that what I claim is—

The method of producing artificial leather which consists in felting together vegetable fibers and wool, saturating the same with a compound of boiled linseed-oil, colophony, French turpentine, vegetable-wax, glycerin, glue, casein, borax, and bichromate of potash, partially drying the so-saturated felt or bat, immersing the same in a solution of acetate of alumina, drying the same, rubbing from the surface thereof any protruding fibers, and finally pressing and glazing.

In testimony that I claim the foregoing as my invention I have signed my name in presence of two subscribing witnesses.

HARALD LYKKE BAGGER MÖRCH.

Witnesses:
 JULES BLOM,
 H. BRUNCHMANN.